United States Patent
Van Der Goot et al.

(10) Patent No.: US 10,022,020 B2
(45) Date of Patent: Jul. 17, 2018

(54) DEVICE AND METHOD FOR TREATING AND PROCESSING FOOD PRODUCTS AND FOOD COMPONENTS

(75) Inventors: Eddy Alfred Herre Van Der Goot, Barneveld (NL); Rudolf Johan Veeneman, Barneveld (NL)

(73) Assignee: MOBA GROUP B.V., Barneveld (NL)

( * ) Notice: Subject to any disclaimer, the term of this patent is extended or adjusted under 35 U.S.C. 154(b) by 1179 days.

(21) Appl. No.: 14/235,840

(22) PCT Filed: Jul. 27, 2012

(86) PCT No.: PCT/NL2012/050538
§ 371 (c)(1),
(2), (4) Date: Apr. 23, 2014

(87) PCT Pub. No.: WO2013/019109
PCT Pub. Date: Feb. 7, 2013

(65) Prior Publication Data
US 2014/0226870 A1    Aug. 14, 2014

Related U.S. Application Data

(60) Provisional application No. 61/512,945, filed on Jul. 29, 2011.

(30) Foreign Application Priority Data

Jul. 29, 2011  (EP) .................................... 11006255
Jan. 20, 2012  (EP) .................................... 12000349

(51) Int. Cl.
*A47J 43/14*   (2006.01)
*G06T 7/00*    (2017.01)
(Continued)

(52) U.S. Cl.
CPC ............. *A47J 43/145* (2013.01); *A22B 7/001* (2013.01); *B07C 9/00* (2013.01); *G06T 7/0002* (2013.01); *H04N 7/18* (2013.01)

(58) Field of Classification Search
CPC .......... A47J 43/145; A23B 7/001; B07C 9/00; G06T 7/0002; H04N 7/18
See application file for complete search history.

(56) References Cited

U.S. PATENT DOCUMENTS 1,824,693 A * 9/1931 Smith ....................... B07C 5/24
                                                    209/515
2,718,906 A * 9/1955 Adams ................... A47J 43/145
                                                    99/486

(Continued)

OTHER PUBLICATIONS

CAB Incorporated Sheet. "Surface Roughness Conversion". No date provided.*

(Continued)

*Primary Examiner* — Anthony Weier
(74) *Attorney, Agent, or Firm* — Marvin Petry; Stites & Harbison PLLC

(57) ABSTRACT

The present invention relates to a food processing device, for example but not exclusively, a gripper, a conveying hook, or a collection cup (1), having at least one processing surface portion of matt stainless steel having the following roughness characteristics: —a roughness value Ra, 0.2≤Ra≤1.2 (μm), and —a peak density value Rpc, 40<Rpc<140 (1/cm). It has been found that with devices treated in this manner, the application of vision technology is appreciably improved, so that much more reliable images are obtained. An example of this concerns observing yolk in albumen upon the breaking of eggs in egg breakers. Further, a particularly advantageous combination of usefulness is obtained, in this case for vision and cleanability.

15 Claims, 1 Drawing Sheet

(51) Int. Cl.
*H04N 7/18* (2006.01)
*A22B 7/00* (2006.01)
*B07C 99/00* (2009.01)

(56) References Cited

U.S. PATENT DOCUMENTS

| | | | | |
|---|---|---|---|---|
| 3,556,874 A | * | 1/1971 | McClain | B21B 1/227 |
| | | | | 148/325 |
| 5,293,815 A | * | 3/1994 | Tomosue | A47J 43/145 |
| | | | | 99/498 |
| 5,415,084 A | | 5/1995 | Tomosue | |
| 5,613,429 A | | 3/1997 | Pettazzi | |
| 5,858,434 A | | 1/1999 | Thomas | |
| 8,367,131 B2 | * | 2/2013 | Kristensen | A47J 43/145 |
| | | | | 426/231 |
| 2005/0116397 A1 | * | 6/2005 | Kimura | B24C 3/14 |
| | | | | 266/135 |
| 2005/0241737 A1 | * | 11/2005 | Ujiro | C21D 6/002 |
| | | | | 148/650 |
| 2006/0041448 A1 | * | 2/2006 | Patterson | G06Q 10/101 |
| | | | | 705/301 |
| 2007/0126201 A1 | * | 6/2007 | Crandall | B60R 3/002 |
| | | | | 280/163 |
| 2008/0108281 A1 | * | 5/2008 | Voges | B24C 1/086 |
| | | | | 451/38 |
| 2009/0202380 A1 | * | 8/2009 | Conrad | C21D 8/0205 |
| | | | | 420/49 |
| 2011/0223300 A1 | | 9/2011 | Purgatorio | |
| 2013/0008475 A1 | * | 1/2013 | Robinson | G01N 33/08 |
| | | | | 134/115 R |
| 2014/0226870 A1 | | 8/2014 | Van Der Goot et al. | |

OTHER PUBLICATIONS

Heinz. 2013. Principles and Practices for the Safe Processing of Foods. p. 127.*
Pelbo, "Albuchecker « Pelbo—Egg breaking and egg processing equipments", pp. 3-6, http://www.pelbo.it/produzione/egg-breaking/rilevamento-automatico-tuorlo-duovo/albuchecker/.
European Examination Report, Application No. 12 750 858.8—1656, dated Oct. 2, 2015, 5 pages.
Leslie M. Bernick, et al., "Development of a Quantitive Sheet Galling Test", Jun. 1, 1978, pp. 323-346, vol. 48, No. 2, Wear, Elsevier Sequoia S.A., Lausanne—Printed in the Netherlands, XP055216203.
User's Manual, "Surface Roughness Tester", No. 99MBB091AB, Series No. 178, Mitutoyo.
International Search Report for PCT/NL2012/050538 dated Oct. 31, 2012.
European Examination Report for EP 12 750 858.8 dated Feb. 16, 2015.
Milledge, John J., "The cleanability of stainless steel used as a food contact surface: an updated short review", Stainless Steel, (2009) vol. 24, No. 3, pp. 19-20.

* cited by examiner

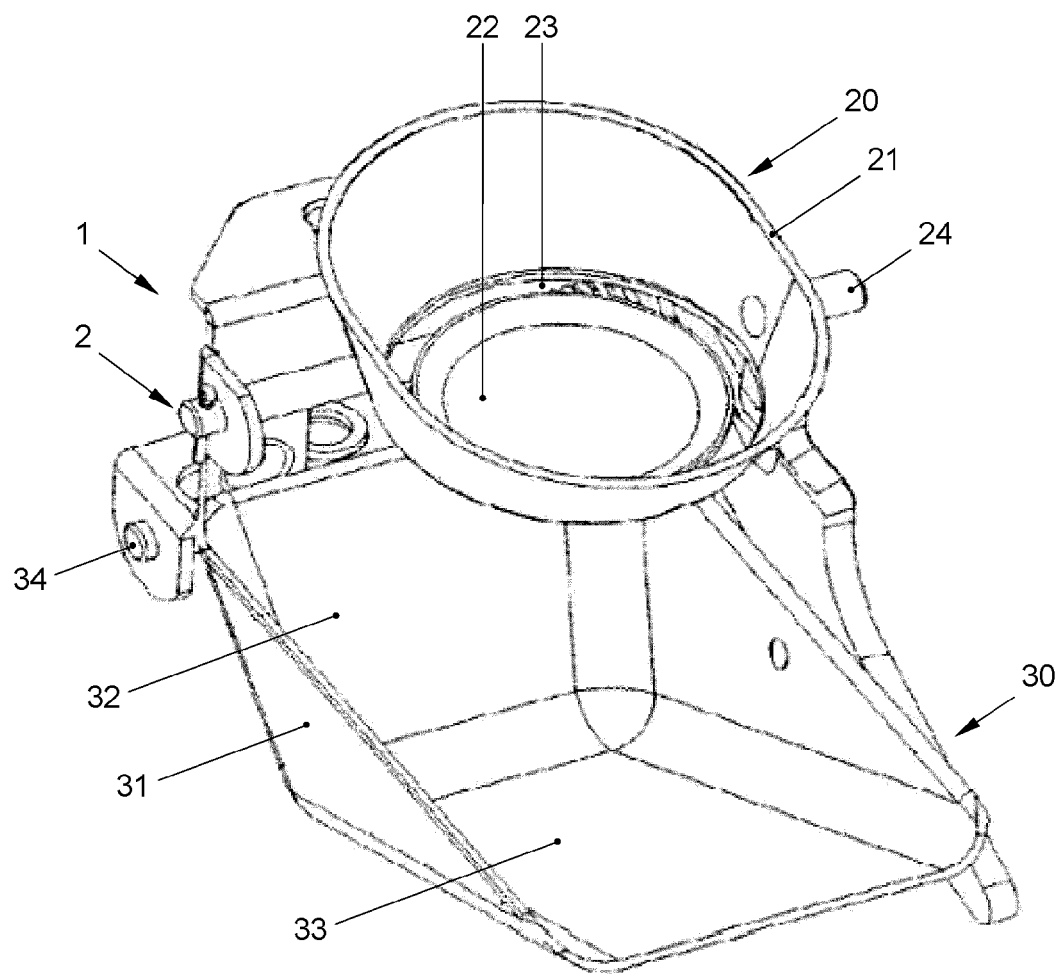

DEVICE AND METHOD FOR TREATING AND PROCESSING FOOD PRODUCTS AND FOOD COMPONENTS

The present invention relates to a device for treating and processing food products and food components, for example, but not exclusively, a gripper, a conveying hook, or a collection cup, having at least one processing surface portion of matt stainless steel.

A collection cup for collecting albumen (the white of an egg) is known from, e.g., U.S. Pat. No. 5,293,815. In this document an invention of Japanese origin is disclosed, with an explanation of how the particular construction disclosed is properly cleanable. Further, it is indicated that, advantageously, stainless steel is utilized, which enables proper washing and improves removal of bacterial residues. Such cups are generally manufactured from electrolytically polished stainless steel.

Collection cups of this type are used very widely. Especially in recent years, for such systems, vision technology with a known type of camera has been used, not only to follow and monitor the course of the process, but also to test the breaking and separating results for each albumen-yolk collection cup. To anyone skilled in the art, it is clear that traces of yolk in albumen, leaving aside any further combinations occurring upon improper breaking, or in the case of rotten eggs, are of great influence on the fluid then obtained, and thus on the economic value thereof.

An example of following and checking fluid obtained in this manner is known from brochures of the firm of PELBO concerning their 'Albuchecker'. It has been found that such a combination of cameras and collection cups gives insufficient results. This must be attributed, for one thing, to the material used for the collection cups.

In order to improve the results of such cameras, the food processing device according to the invention is characterized in that it comprises at least one processing surface portion of matt stainless steel having the following roughness characteristics, a roughness value Ra in µm, $0.2 \leq Ra \leq 1.2$ µm, and
a peak density value Rpc, $40 < Rpc < 140$ 1/cm.

In an advantageous exemplary embodiment of the invention the food processing device is characterized in that the roughness value Ra is preferably in the range of $0.3 < Ra < 1.0$ µm.

In a further advantageous exemplary embodiment of the invention, the food processing device is characterized in that the roughness value Ra is preferably in the range of $0.3 < Ra < 0.5$ µm.

According to a further elaboration, the roughness value Ra is in the range of from 0.2 through 0.7 µm ($0.2 \leq Ra \leq 0.7$ µm).

According to a further elaboration, the peak density value Rpc is greater than 60 cm$^{-1}$ and less than 140 cm$^{-1}$ ($60 < Rpc < 140$ 1/cm).

It has been found that the thus obtained mattness takes away the reflections upon exposure and thereby considerably improves the images in the situation of collection cups for testing on the presence of yolk in albumen.

A further advantage has been found to be the enlargement of the margins and possibilities of designing such devices, in particular in the case of the above-mentioned collection cups. More particularly, savings of space have been realized whereby the collection cups, instead of comprising cup faces adjoining each other obliquely, now also comprise transitions at right angles.

It has been found, furthermore, that with devices treated in this manner, the application of vision technology is improved appreciably, so that much more reliable images are obtained. An example of this comprises observing yolk in albumen upon the breaking of eggs in egg breakers.

Furthermore, a particularly advantageous combination of usefulness is obtained, in this case for vision and cleanability.

According to a further elaboration, the device comprises a collection cup for fluids, for example, albumen, wherein the processing surface portion is a bottom portion of the collection cup, the collection cup being characterized by one or more of the following features:

that the bottom portion possesses an optical reflection Ry, in gloss units GU, in the 20° measuring range according to $8 < Ry_{20} < 14$, and in the 60° measuring range according to $45 < Ry_{60} < 70$;

that at least the bottom portion of the cup possesses further roughness characteristics for the derivative of the total interpeak area Mr2 according to $85 < Mr2 < 93\%$, and for the derivative of the total peak volume Rvk according to $0.4 < Rvk < 1.8$ µm; and that at least the bottom portion of the cup possesses further roughness characteristics for the derivative of the total interpeak area Mr2 according to $85 < Mr2 < 93\%$, and for the derivative of the total peak volume Rvk according to $0.5 < Rvk < 0.9$ µm, and in particular Rvk, $0.4 < Rvk < 0.9$ µm.

Furthermore, the invention provides systems and apparatuses to be identified in more detail hereinbelow, in which such roughness characteristics can be applied for the same reasons and with similar advantages.

Thus, the present invention provides a slaughter apparatus for slaughtering and processing animals, for example, but not exclusively, cattle, pigs, fowl, or poultry, comprising food processing devices, for example, but not exclusively:

feeder conveyors having, for example, but not exclusively, feeder trays, conveying hooks, and/or conveyor belts, having slaughtering tools, for example, but not exclusively, knives and/or saws, and discharge conveyors having, for example, but not exclusively, discharge trays, conveying hooks, and/or conveyor belts, wherein the food processing devices possess roughness characteristics according to the invention.

The present invention further provides a collection cup for fluids, for example, but not exclusively, albumen, having at least a bottom portion in accordance with roughness characteristics as specified above.

An advantageous exemplary embodiment of such a collection cup is characterized in that the bottom portion possesses an optical reflection Ry, in gloss units GU, of in the 20° measuring range, $8 < Ry_{20} < 14$ and
in the 60° measuring range, $45 < Ry_{60} < 70$.

Surprisingly, it has been found that with a well-defined surface roughness having characteristics in accordance with the present invention, further the optical reflectivity, Ry, is selectable; this is understood to mean that as a consequence of a slightly differently chosen combination of roughness parameter values, a likewise altered Ry is obtained. Especially in the detection of colors and contrasts in fluids, more particularly in fluids such as albumen and yolk, this is of utmost importance. Traces of these fluids in or on materials having these roughness characteristics are thus traceable in a highly advantageous and favorable manner. Consequently, such a detection can contribute in a highly advantageous manner to the quality of processes of egg treatment and processing, such as sorting and breaking.

For further details, explanation and definition of the reflectivity Ry, reference is made to website www.glossmeter.com.

A further exemplary embodiment of such a collection cup has the feature that at least the bottom portions possess further roughness characteristics, for the derivative of the total interpeak area Mr2, 85<Mr2<93%, and for the derivative of the total peak volume Rvk, 0.4<Rvk<1.8 μm.

In a yet further exemplary embodiment, such a collection cup has the feature that at least the bottom portions possess further roughness characteristics:

for the derivative of the total interpeak area Mr2, 85<Mr2<93%, and for the derivative of the total peak volume Rvk, 0.4<Rvk<0.9 μm, for example, 0.5<Rvk<0.9 μm.

Further, the invention comprises an apparatus for breaking eggs, having collection cups for, after breaking, at least receiving and collecting albumen, wherein the collection cups possess characteristics according to one or more of the above-mentioned specifications.

In an advantageous exemplary embodiment, such an apparatus has the feature that the collection cups furthermore comprise cups for receiving and collecting yolk.

For specifics and definitions of the above-mentioned roughness parameters, reference is made to INTERNATIONAL STANDARD, ISO 136565-2 1996 (E), as well as to Mitutoyo, User's Manual, SJ-301, No. 99MBB091A8, SERIES No. 178. More particularly, this concerns the details on page 5.33 of the references under JIS'01 and DIN4776.

It is noted that the measurements were carried out with the roughness meter according to the Mitutoyo Manual as identified above.

More particularly, Ra and Rpc are characteristics concerning the roughness peaks, viz., height and numbers. Ra is generally known as 'average roughness'. Rpc is generally known as 'Peak Count'. It is these features that are deemed determinative of the existence and the properties of matt surfaces instead of more glossy aspects.

The other characteristics mentioned, Mr2 and Rvk, are area- and content-related, or also relating to space, and in this manner are indications of retention and accumulation of particles and fluids. Mr2 is generally known as the 'Valley material component'. Rvk is generally known as 'Reduced valley depth'. Therefore these characteristics will approximately determine the cleanability.

The invention also comprises a system, at least comprising a detection device for imaging at least parts of the devices as mentioned above, as well as a device for processing the images mentioned.

Further, the present invention comprises an apparatus for sorting eggs, comprising parts having processing surface portions of matt stainless steel having roughness characteristics according to the above-mentioned claims. For example, but not exclusively, screening and supporting plates under roller sections of such an apparatus may be mentioned. For example, this concerns a portion of the egg feeder section where the above-indicated 'vision' is applied for characterizing products such as eggs to thereby enable a proper sorting. Furthermore, such vision may be applied in conveying eggs already sorted, for example, directly after placement in packaging units, intended as a further test or check.

It is noted that in the case of the above-mentioned instance of collection cups for yolk and albumen in the egg breaker application, cups of translucent plastic are utilized, especially developed for the vision application, as described in EP2002770. With such a solution, reflection is obviated altogether. However, it has been found that such plastic is subject to wear upon regular cleaning. To anyone skilled in the art it will be clear that frequent and thorough cleaning cannot be avoided in the first place but specifically for plastic has wholly different consequences than for stainless steel. To anyone skilled in the art it will be clear that cups implemented according to the present invention—as food processing device—have considerable advantages over those of plastic.

A further advantage of the roughness characteristics as detailed above is the cleanability, which is now known to have improved considerably for materials treated in this manner. For a general explanation on the cleaning of electrolytically polished stainless steel, reference is made to an article by Uittenbroek, "Reinigbaarheid RVS na oppervlaktebehandeling", ROESTVAST STAAL 1-2002 ["Cleanability of stainless steel after surface treatment", STAINLESS STEEL 1-2002"].

Further, in a publication in Chemisch2Weekblad, 29 Nov. 2010, results are described of TNO research on stainless steel whose surface had been slightly roughened up.

Yet another suitable treatment is described in De Wit en Overkamp, Oppervlaktetechnieken (32) 1988 No. 4.

To anyone skilled in the art it will be clear that stainless steel treated in this way can be applied in a very suitable manner, having regard to the increasingly stricter requirements set in respect of the hygienic conditions in the processing of food products and food components, i.e., meat and eggs in this case, as well as products in which these components are incorporated, for example, sandwich filling, sauces, and the like. For properties of materials as mentioned in this connection, again reference is made to the descriptions of the above-mentioned results and publications.

To anyone skilled in the art it will be clear, furthermore, that existing apparatus in the field of this technology, i.e., food processing, can be adapted in a simple manner with such a surface treatment alone.

An aspect of the invention provides furthermore a method for observing yolk in albumen upon the breaking of eggs in egg breakers, comprising the use of a collection cup according to an aspect of the invention to receive the albumen, and observing the albumen received in the collection cup with a detection device (for example, a camera as mentioned). With this, the above-mentioned advantages can be achieved.

Below, on the basis of a single example from food processing, details of the present invention will be elucidated.

BRIEF DESCRIPTION OF THE DRAWING

FIG. 1 shows a breaker cup unit.

In FIG. 1 a breaker cup unit 1 is shown, viewed obliquely from above, just short of full-size. Such a unit 1 is typically one in a whole row, is part of and arranged in an egg breaking apparatus, and coupled to or connected with an endless conveyor. Further details on egg breaking are given in the above-mentioned document EP2002770.

Basically, the steps in the breaking of an egg, from a row of successive eggs, are:

taking up an egg in a clamp with two clamp halves,
cleaving the egg with a striking knife, moving the clamp halves apart, while the shell halves are held in the clamps and the egg content falls and drips from the shell halves moving apart, receiving this content with a cup unit 1 as mentioned above, whereby, via an upper yolk cup 20 for receiving substantially the yolk of the egg, the albumen (white of the egg) drips further down and is collected in an albumen cup 30.

More particularly, there are indicated in FIG. 1, the yolk cup 20, having substantially a circumferential shape of the lower part of a sphere, including a yolk cup wall 21, which occupies the upper part of this circumferential shape, yolk cup bottom 22 which occupies the lower part of this circumferential shape, a leak slot 23 which is a recess or slot between the yolk cup wall 21 and the yolk cup bottom 22 and which serves to allow the greater part of the albumen to run, flow or drip further downwards, and the albumen cup 30, having substantially a scoop-shaped circumferential shape, including albumen cup walls 31 on the longitudinal sides of the albumen cup 30, first bottom part 32 on the short side of the scoop and extending substantially in vertical direction, and a second bottom part 33 on the long side of the scoop and extending substantially in horizontal direction.

Such a cup unit 1 is connected through a coupling 2 with the above-mentioned endless conveyor. Separate tilting of the yolk cup 20 is enabled with a yolk cup tilting pin 24, and of the albumen cup 30 with an albumen cup tilting pin 34. Further lines indicated in the albumen cup 30 are descriptive lines at bending edges, at the transitions between the different parts 31, 32, 33 of this cup 30.

Conventionally, such cup units 1 are made of stainless steel, for example, RVS304. The method pursued to date for making the parts of such a cup unit cleanable is that of electrolytic polishing. Further details about this have been mentioned hereinabove. Basically, the parts of such a cup unit exhibit a reflecting effect.

In the use of vision technology, in a conventional manner, exposure and observation (in particular by a camera as mentioned) take place substantially from above. In particular, as follows from the foregoing, a method for observing yolk in albumen comprises the use of a collection cup as mentioned to receive the albumen, wherein a detection device is utilized for observing the albumen received in the collection cup (to detect unwanted traces of yolk).

Not surprisingly, the reflecting effect referred to will considerably influence the analysis of the image recordings of the two cups 20, 30 and, worse, will disturb it. It has been found that this problem can be reduced or solved with a cup unit—as food processing device—that satisfies one or more features of the present invention.

Thus, it has been found that with roughness characteristics according to the present inventions, also a reflectivity Ry is obtained that considerably improves analyzing of the image recordings. In particular, yolk residues in the albumen fluid mass in the albumen cup 30 can be recognized very clearly. Further typing thereof, as well as processing of the obtained typing and characteristics derived therefrom, makes a suitable and advantageous processing of these food components possible. Furthermore, it is mentioned here that the reflectivity referred to was determined with a NOVO-GLOSS LITE GLANSMETER, type VF2463, reference being made to website www.tqc.eu.

Further particulars about definitions and measuring procedures can be found in Rhopoints Instruments Ltd., Novo-Gloss Lite Operation Manual, Revision A English, June 2007, DRD5000-011.

To anyone skilled in the art it is self-evident that the invention is not limited to the exemplary embodiments described. Diverse alterations are possible within the framework of the invention as set forth in the following claims.

To anyone skilled in the art it will be clear that many parts and components of such food processing devices may be implemented in this manner.

Deviations, as well as parts or components of such equipment or machines that are not specified here, are understood to be within the scope of protection of the appended claims.

Thus, the invention is not limited to the processing of eggs. As follows from the above, the invention can be used with advantage, for example, in a slaughter apparatus for slaughtering and processing animals, for example, but not exclusively, cattle, pigs, fowl, or poultry.

1 breaker cup unit
2 coupling
20 yolk cup
21 yolk cup wall
22 yolk cup bottom
23 leak slot
24 yolk cup tilting pin
30 albumen cup
31 albumen cup wall
32 first bottom part
33 second bottom part
34 albumen cup tilting pin

The invention claimed is:

1. A food processing device comprising a collection cup, having at least one processing surface portion of matt stainless steel having the following roughness characteristics:
    a roughness value Ra, $0.2 \leq Ra \leq 1.2$ (μm), and
    a peak density value Rpc, $40 < Rpc < 140$ (1/cm),
        and wherein the process surface portion includes a bottom portion which possesses an optical reflection Ry, in gloss units GU,
    in the 20° measuring range, $8 < Ry_{20} < 14$ and
    in the 60° measuring range, $45 < Ry_{60} < 70$.

2. A food processing device according to claim 1, wherein the roughness value Ra is in the range of $0.3 < Ra < 1.0$ (μm).

3. A food processing device according to claim 1, wherein the roughness value Ra is in the range of $0.3 < Ra < 0.5$ (μm).

4. A food processing device according to claim 1, wherein the roughness value Ra is in the range of from 0.2 through 0.7 μm ($0.2 \leq Ra \leq 0.7$ μm).

5. A food processing device according to claim 1, wherein the peak density value Rpc is greater than 60 cm$^{-1}$ and less than 140 cm$^{-1}$ ($60 < Rpc < 140$ 1/cm).

6. A food processing device according to claim 1, wherein the bottom portion has one or more of the following features:
    an optical reflection Ry, in gloss units GU, in the 20° measuring range according to $8 < Ry_{20} < 14$, and in the 60° measuring range according to $45 < Ry_{60} < 70$;
    further roughness characteristics for the derivative of the total interpeak area Mr2 according to $85 < Mr2 < 93\%$, and for the derivative of the total peak volume Rvk according to $0.4 < Rvk < 1.8$ μm; and
    further roughness characteristics for the derivative of the total interpeak area Mr2 according to $85 < Mr2 < 93\%$, and for the derivative of the total peak volume Rvk according to 0.4<Rvk<0.9 μm, and in particular Rvk, 0.5<Rvk<0.9 μm.

7. A collection cup according to claim 1, wherein at least the bottom portion possess further roughness characteristics,
for the derivative of the total interpeak area Mr2, 85<Mr2<93%, and
for the derivative of the total peak volume Rvk, 0.4<Rvk<1.8 μm.

8. A fluid collecting device according to claim 1, wherein at least the bottom portion possess further roughness characteristics,
for the derivative of the total interpeak area Mr2, 85<Mr2<93%, and
for the derivative of the total peak volume Rvk, 0.4<Rvk<0.9 μm, and in particular Rvk, 0.5<Rvk<0.9 μm.

9. An apparatus for breaking eggs, having collection cups for, after breaking, at least receiving and collecting albumen, wherein said collection cups possess the characteristics according to claim 1.

10. An apparatus according to claim 9, wherein the collection cups are constructed to receive and collect yolk.

11. A system comprising a detection device for imaging at least parts of the food collecting devices according to claim 1 and an inspecting device for processing and inspecting images.

12. A method for observing yolk in albumen upon the breaking of eggs in egg breakers, comprising the use of a collection cup according to claim 6 to receive the albumen, and observing the albumen received in the collection cup with a detection device.

13. A food processing device, comprising a collection cup, having at least one processing surface portion of matt stainless steel having the following roughness characteristics:
a roughness value Ra, $0.2<Ra<1.2$ (μm), and
a peak density value Rpc, $40<Rpc<140$ (1/cm),
wherein the process surface portion is a bottom portion which has one or more of the following features:
an optical reflection Ry, in gloss units GU, in the 20° measuring range according to $8<Ry_{20}<14$ and in the 60° measuring range according to $45<Ry_{60}<70$;
further roughness characteristics for the derivative of the total interpeak area Mr2 according to 85<Mr2<93%, and for the derivative of the total peak volume Rvk according to 0.4<Rvk<1.8 μm; and
further roughness characteristics for the derivative of the total interpeak area Mr2 according to 85<Mr2<93%, and for the derivative of the total peak volume Rvk according to 0.4<Rvk<0.9 μm, and in particular Rvk, 0.5<Rvk<0.9 μm.

14. A food processing device comprising a collection cup, having at least one processing surface portion of matt stainless steel having the following roughness characteristics:
a roughness value Ra, $0.2 \leq Ra \leq 1.2$ (μm), and
a peak density value Rpc, $40<Rpc<140$ (1/cm),
wherein the processing surface bottom portion, possesses further roughness characteristics
for the derivative of the total interpeak area Mr2, 85<Mr2<93%, and
for the derivative of the total peak volume Rvk, 0.4<Rvk<1.8 μm.

15. A food processing device comprising a collection cup, having at least one processing surface portion of matt stainless steel having the following roughness characteristics:
a roughness value Ra, $0.2 \leq Ra \leq 1.2$ (μm), and
a peak density value Rpc, $40<Rpc<140$ (1/cm),
wherein the process surface portion includes a bottom portion, and wherein at least the bottom portion possesses further roughness characteristics,
for the derivative of the total interpeak area Mr2, 85<Mr2<93%, and
for the derivative of the total peak volume Rvk, 0.4<Rvk<0.9 μm.

* * * * *